US012548444B2

(12) United States Patent
Orlowski et al.

(10) Patent No.: US 12,548,444 B2
(45) Date of Patent: Feb. 10, 2026

(54) ASSISTED PARKING SYSTEM

(71) Applicant: Aptiv Technologies AG, Schaffhausen (CH)

(72) Inventors: Mateusz Orlowski, Cracow (PL); Nikodem Pankiewicz, Cracow (PL); Michal Sokol, Cracow (PL); Wojciech Turlej, Cracow (PL)

(73) Assignee: Aptiv Technologies AG, Schaffhausen (CH)

(*) Notice: Subject to any disclaimer, the term of this patent is extended or adjusted under 35 U.S.C. 154(b) by 98 days.

(21) Appl. No.: 18/428,290

(22) Filed: Jan. 31, 2024

(65) Prior Publication Data

US 2024/0257640 A1 Aug. 1, 2024

(30) Foreign Application Priority Data

Jan. 31, 2023 (EP) .................................... 23154272

(51) Int. Cl.
*G08G 1/14* (2006.01)
*B60W 30/06* (2006.01)

(52) U.S. Cl.
CPC ............. *G08G 1/142* (2013.01); *B60W 30/06* (2013.01); *B60W 2420/00* (2013.01); *B60W 2552/00* (2020.02); *B60W 2556/40* (2020.02); *B60W 2556/45* (2020.02)

(58) Field of Classification Search
CPC .. G08G 1/142; B60W 30/06; B60W 2552/00; B60W 2556/40; B60W 2556/45; B60W 2420/00
See application file for complete search history.

(56) References Cited

U.S. PATENT DOCUMENTS

| | | | | |
|---|---|---|---|---|
| 9,171,382 | B2 * | 10/2015 | Nerayoff | G06T 7/73 |
| 10,115,309 | B2 * | 10/2018 | Belzner | G08G 1/147 |
| 2017/0355307 | A1 | 12/2017 | Ha | |

(Continued)

FOREIGN PATENT DOCUMENTS

DE 102008027779 A1 12/2009

OTHER PUBLICATIONS

Extended European Search Report for EP23154272.1, 11 pages Jul. 7, 2023.

(Continued)

*Primary Examiner* — Gertrude Arthur Jeanglaude
(74) *Attorney, Agent, or Firm* — Miller Johnson

(57) ABSTRACT

Disclosed is a method for assisted parking of a vehicle. The method includes obtaining data associated with a surrounding of the vehicle. The method includes identify in the data a set of candidate parking spaces for the vehicle that meet at least one criterion associated with the vehicle. The method includes selecting one parking space for parking the vehicle out of the set. The method includes obtaining data associated with the surrounding of the selected parking space. The method includes determining whether the selected parking space meets the at least one criterion based on the data associated with the surrounding of the selected parking space. In response to the selected parking space being determined to meet the at least one criterion, the method further includes performing a parking maneuver, or selecting another parking space out of the set.

16 Claims, 4 Drawing Sheets

(56) References Cited

U.S. PATENT DOCUMENTS

| | | | | |
|---|---|---|---|---|
| 2018/0308358 | A1 | 10/2018 | Hayakawa | |
| 2019/0291720 | A1 | 9/2019 | Xiao | |
| 2022/0350994 | A1* | 11/2022 | Yang | B60W 30/06 |

OTHER PUBLICATIONS

Office Action received for EP23154272.1 dated Oct. 25, 2024, 8 pages.

European Patent Office, Office Action regarding European Application No. 23154272.1, dated Dec. 4, 2024, 7 pages.

* cited by examiner

ASSISTED PARKING SYSTEM

CROSS-REFERENCE TO RELATED APPLICATIONS

This application claims priority to EP 23 154 272 filed Jan. 31, 2023, the entire disclosure of which is incorporated by reference.

FIELD

The present disclosure relates to assisted parking of a vehicle, and in particular to predictive assisted parking.

BACKGROUND

Nowadays, vehicles, such as cars are facing a paradigm shift towards software driven platforms with advanced sensing and control means so as to provide some degree of assistance to the driver. One example of which is assisted or even autonomous parking. Thereby the vehicle system gathers data from various onboard sensors regarding the surroundings of the vehicle as the vehicle travels along. The obtained data is then filtered to identify possible parking spaces and confirm that they are suitable for the vehicle, before they are indicated to the user or in an autonomous manner used for parking.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The invention is defined by the claims. Embodiments and aspects that do not fall within the scope of the claims are merely examples used for explanation of the invention.

However, the drawback of these systems is that they work on filtered data, which means that the parking space is only identified and confirmed to be suitable for the vehicle once the vehicle has passed the possible parking space. This may also be called retrospective assisted parking, since the opportunity to park the vehicle in a free parking space has already past before the vehicle can use it. This means the vehicle must stop and reverse to the former location to use the parking space. In heavy traffic situations this may not only be dangerous, but in crowded areas also not possible. Furthermore, during the time it takes to reverse the vehicle, the identified parking space may also already be occupied such that it can no longer be used and the vehicle needs to driver further mileage to find another parking space.

Therefore, a need exists to provide an assisted parking system with which the aforementioned drawbacks can be overcome. Hence one which makes reversal and unnecessary mileage consumption obsolete due to predictive assisted parking. Hence a parking which allows to identify parking spaces laying ahead in the direction of travel before the vehicle has passed them.

The aforementioned need is fulfilled by the assisted parking method, system, and computer computer-readable storage medium according to the current invention.

Thereby, the method according to the invention comprises as a first step obtaining data associated with a surrounding of the vehicle. This data may also be called first data due to being obtained at a first location of the vehicle. This data may be obtained from different onboard sensors of the vehicle. These onboard sensors may include a camera, an ultrasonic sensor, a radar sensor, a Light Detection and Ranging, LiDAR, sensor, or a combination thereof. However, also other sensors may be contemplated which allow to obtain data of the surrounding of the vehicle. The data may also be obtained by receiving the data from other vehicles or entities. The reception my be done via a vehicular communication system, which is capable of V2X communications. It is contemplated that the first data may also be obtained from a combination of onboards sensors and/or remote sensors, which are in communication with the vehicle, either directly or via other devices. The data itself may represent the long-range surrounding of the vehicle, meaning covering at least multiple vehicle lengths surrounding of the vehicle. Due to the large area covered by the data, the data may have a low resolution, but enough to identify candidate parking spaces within the data. It can also be said that the first data have a certain uncertainty adhered thereto.

The method according to the invention then uses the obtained first data to identify in the first data a set of candidate parking spaces for the vehicle which meet at least one criterion associated with the vehicle. Thereby, the data may at first be characterized in non-free spaces, for example obstacles like other vehicles, and free spaces. The free spaces may then be compared to the at least one criterion and if there is a match a candidate parking space is identified. Thereby, the match does not need to be a one-to-one match, but a match within a certain range of an error threshold. The comparison preformed for the identification may for example be done by a machine learning process and the error threshold may be trained during reinforced learning. It is however also possible that the error threshold is preset and associated with obtaining the first data, for example based on the kind of sensor used to obtain the first data. The at least one criterion on which the identification is based may be at least the space the vehicle needs to park. The space may be given by the dimensions of the vehicle, for example the lengths and/or width of the vehicle. Thereby, whether lengths or width is used as the at least one criterion may dependent upon how the vehicle shall be parked, the lengths of the vehicle may be decisive when the vehicle shall be parked sideways and the width of the vehicle may be decisive if the vehicle shall be parked forwards or backwards. It is also contemplated that the at least one criterion not only factors in the dimensions of the vehicle, but also other circumstances, which may be specific to the vehicle or the driver. For example, it may also need to be factored in how maneuverable the vehicle is and as such how much space the vehicle needs in addition to its raw dimensions to be parked. Furthermore, depending on how the doors of the vehicle open, also additional space must be accounted for. Furthermore, if the driver needs to get out accessories, like a stroller or wheelchair, extra space needs to be accounted for. As such, it is contemplated that some of the at least one criterion may be preset, whereas others may be set by the user. It is also contemplated that the vehicle includes indoor sensors, which detect any circumstances which may affect the at least one criterion, like for example the presence of accessories, the number of passengers, or any other circumstance. Based on the detection the at least one criterion may be set automatically. It is also contemplated that more than one criterion are applied to identify a useable parking space within the first data. Identifying the set of candidate parking spaces may thereby comprise generating from the obtained data a map to identify the set of parking spaces. The map may represent obstacles, their locations and therefore inherently also the space between the obstacles, which then can be compared to the at least one criterion, for example the space needed to park the vehicle. It shall be understood that the parking spaces can also be identified by other representation of the data which facilitates identification of non-free spaces versus free spaces, which allows a comparison with the at least one criterion.

The method according to the invention further comprises to select one parking space out of the set of candidate parking spaces. The selection my thereby be automatic or manual. In the automatic case, the system selects one parking space on its own, without user interaction. Thereby, the system may use at least one selection criterion to select the one parking space. For example, the system may select the parking space closest to the current location of the vehicle, or the system may select one parking space in the closest proximity of a user defined location. In the manual case, the user may be presented with a list or map of the candidate parking spaces and may manually select one.

Once the vehicle is in the vicinity of the selected parking space, the method according to the invention comprises obtaining data associated with the surrounding of the selected parking space. This data may also be called second data due to being obtained at a second location of the vehicle. This data may be obtained from different onboard sensors of the vehicle. These onboard sensors may include a camera, an ultrasonic sensor, a radar sensor, a Light Detection and Ranging, LiDAR, sensor, or a combination thereof. However, also other sensors may be contemplated which allow to obtain data of the surrounding of the selected parking space. The data may also be obtained by receiving the data from other vehicles or entities. The reception my be done via a vehicular communication system, which is capable of V2X communications. The second data may be obtained from the same sensors or communication systems as the first data. In fact, they may result from the same data stream but at different time instances. This data may represent the short-range surrounding of the vehicle, meaning covering only a few vehicle lengths. This data may however have a higher resolution than the data associated with the surrounding of the vehicle. However, need not to be. The advantage of this data is that it is taken from the second location of the vehicle, meaning the sensors have a different field of view than in the first location. This has the advantage that it can be determined within this data whether the selected parking space is really a valid one, meaning that the parking space really meets the at least one criterion, or not. It is advantageous to have the second data, since the first data may only present a rough representation of the surrounding of the vehicle and some obstacles may not have been detectable or visible at the first location of the vehicle but are now detectable or visible and therefore occur in the second data. It can also be said that the first data is used to predict candidate parking spaces, whereas the second data is then used for verifying of the respective possibility of a parking space.

The method according to the invention thereby comprises a step of determining whether the selected parking space meets the at least one criterion based on the data associated with the surrounding of the selected parking space. For example, if an obstacle has not been identified in the data associated with the surrounding of the vehicle, due to it being not detectable or visible by the sensors at the first location of the vehicle, it may now be detectable. Hence, with the data associated with the surrounding of the selected parking space it can be identified whether or not the selected parking space can be used. If it is determined that the parking space can be used, then an parking maneuver is performed. This assisted parking maneuver can be to guide the user into the selected and verified parking space, or it can be completely autonomous. In case it is determined that the selected parking space is not valid, for example, being obstructed by an obstacle not detectable or visible in the first location, then another parking space out of the set of candidate parking spaces is selected. Again, once in the vicinity of that another selected parking space data associated to the surrounding of this another parking space is obtained and it is determined whether this sparking space can be used. This is repeated until the vehicle can be parked.

This allows for the first time to have assisted parking with a predictive aspect, namely to at first assess the long-range parking situation and once at the location of the candidate parking spaces assess the short-range situation. This exhibits the advantage that the vehicle does not at first need to go past candidate parking spaces, but can identify them upfront in a predictive manner.

In a various embodiment of the invention, the method further comprises guiding the vehicle to the selected parking space. This guidance may either be done by presenting guiding directions on the onboard navigational system or can be done by autonomously driving the vehicle. Thereby, the method according to the invention may comprise planning a path to the selected parking space. Planning the path may thereby comprise planning the path the vehicle has to take to get from the first location to the second location. It can also be said the trajectory or course of the vehicle is planned to get from the first location to the second location. The planning may thereby be done by a machine learning process. This machine learning process may also factor in the obstacles which can be identified in the first data and which may obscure a linear path between the first location and the second location. In case the processing power of the system is limited it may also be beneficial to offload the path planning to a remote entity, like a remote server. In this case, the method may comprise transmitting information regarding at least the selected parking space to a remote server and receiving guidance information indicating a path for the vehicle from the remote server. Thereby, the information transmitted to the remote server may at least be the current location of the vehicle and the location of the selected parking space. Furthermore, any already identified obstacles may be identified in the information. The guidance information received back may be the planned path itself, or just directional guidance, for example in form of a list of trajectories, speed and times, which can be followed. It is also contemplated that the guidance information is a map useable by the onboard navigational system.

In a various embodiment of the invention, the method comprises selecting a parking space lying ahead in the path of travel of the vehicle in order to prevent any reversal maneuvers. Thereby, parking spaces in the identified set of parking spaces can be prioritized which lie in the path of travel of the vehicle, whereas parking spaces lying behind the path of travel can be deprioritized in order to prevent reversal maneuvers. Also, if a selected parking space has been identified to not be valid, due to being determined to not meet the at least one criterion, the selection of the another parking space can be done as such that the selected another parking space lies ahead in the path of travel of the vehicle.

In a various embodiment of the invention, the user can enable the assisted parking by enabling a parking mode. For example, once arriving in a car park, the user may enable parking mode, and the vehicle will start obtaining the first data and proceed to identify free parking spaces. The parking mode may also be enabled already beforehand, for example when the user defines the destination the user wants to drive to in the navigational system, the user may directly enable parking mode at the destination, which then will start the method at the destination or shortly before arriving at the destination. It may also be possible, that the user defines an area on the navigational system in which the user wants the vehicle to park, the method would then start when arriving in the selected area or shortly before automatically.

In a various embodiment of the invention, the parking mode enables automatically. This automatic enabling may for example always be done when a certain speed threshold is reached, which normally indicates that the user has the intention to park. Furthermore, it can enable automatically based on location. For example, the parking mode may always enable at a specific location or within a certain perimeter around a specific location, like home, workplace, or frequently visited locations. It can also automatically enable once a destination set in the navigational system has been reached or is close by.

The method of the current invention can be performed as a computer implemented method and in particular the steps of identify the set of candidate parking spaces, selecting one parking space, or determining whether the selected parking space meets the at least one criterion can be based on a machine learning process.

It shall be understood that whenever in the forgoing it is described that an entity is adapted to perform a specific functionality then this entity possesses the respective means for performing this functionality.

The above-mentioned need is therefore also fulfilled by a system comprising means to perform the steps of the described method. Furthermore, by a vehicle which comprises such a system. Also by a computer-readable storage medium comprising instructions which, when executed by a computer, cause the computer to carry out the described method.

In a various embodiment of the invention, the method further comprises controlling at least one of a path or speed of the vehicle prior or during obtaining the data associated with the surrounding of the vehicle. It may for example be advantageous to reduce speed when obtaining the data, in order to detect as much as possible obstacles and therefore free parking spaces. It may also be advantageous to slightly alter the current path of the vehicle, traffic permitting, to best position the field of view of the sensors.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Various aspects of the present disclosure are described in more detail in the following by reference to the accompanying figures without the present disclosure being limited to the embodiments of these figures.

In the drawings, reference numbers may be reused to identify similar and/or identical elements.

DETAILED DESCRIPTION

Figure 1:
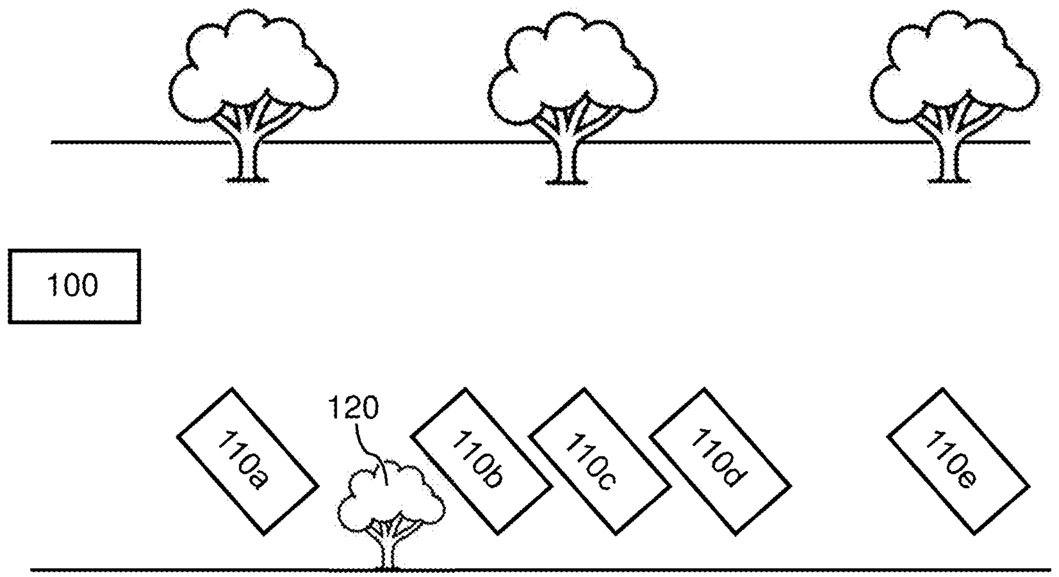
FIG. 1 shows a starting scenario for assisted parking.

FIG. 1 shows a typically, but not limiting, starting scenario for assisted parking of vehicle 100. The scenario shows a typical road view scenario with trees on one side of the street and parked vehicles 110*a*, 110*b*, 110*c*, 110*d*, and 110*e* on the opposing side of the street. Between vehicles 110*a* and 110*b* a first parking space is available, and a second parking space is available between vehicles 110*d* and 110*e*. However, in the first parking space a small bush 120 is effectively blocking the first parking space.

Figure 2:
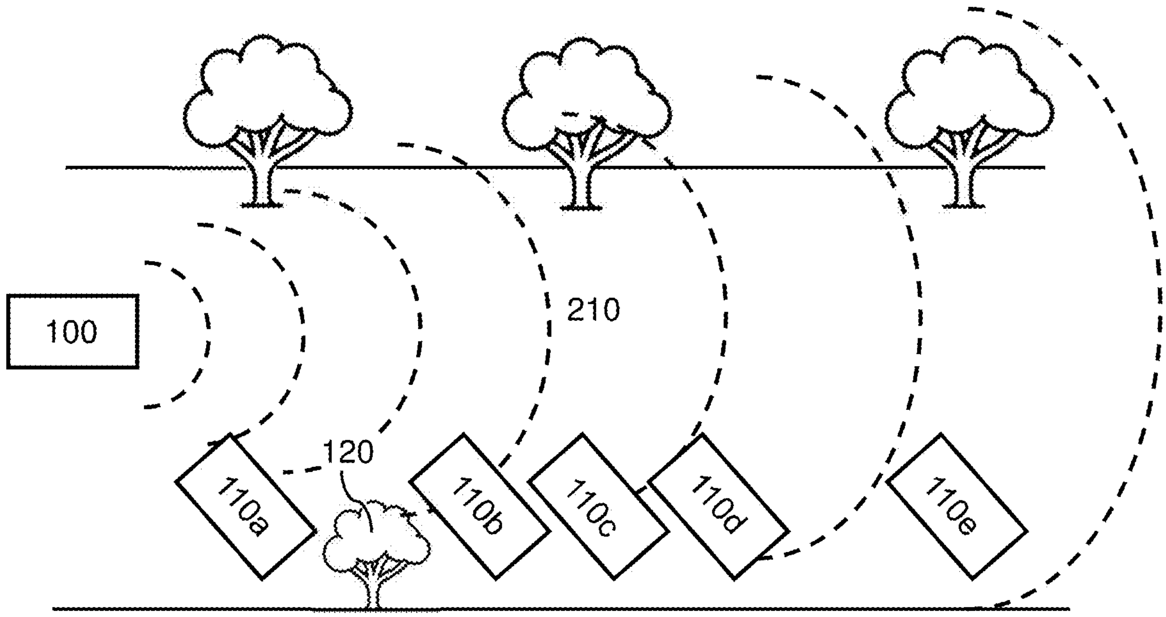
FIG. 2 shows the scenario for assisted parking of FIG. 1 with obtaining first data.

FIG. 2 shows effectively the same situation as FIG. 1 with the parked vehicles 110*a*, 110*b*, 110*c*, 110*d*, and 110*e*. In the here shown example, an onboard radar sensor, not shown, of vehicle 100 has sent out radio waves 210 to obtain data associated with the surrounding of vehicle 100. It can also be said that this data is representing the long-range surrounding of the vehicle 100. As known, the radio waves 210 of a radar sensor are used to determine the distance, angle, and radial velocity of objects relative to the radar sensor, i.e. relative to the vehicle 100. This first data will allow vehicle 100 to map its surrounding and identify obstacles and candidate parking spaces. Here, it can however also bee seen that from the first location the vehicle 100 is in the small bush 120 is not in the field of view of the sensor, since it is blocked by the rear portion of vehicle 110*a*. As such, this bush 120 will not be detectable in the first data and as such also not be identified as an obstacle obstructing the first parking space. Although in the here named example a radar sensor is used to facilitate the understanding of the invention, it is clear that also other kind of sensors can be used, which allow a representation of the surrounding of the vehicle 100. Just to name a few, a camera, a radar sensor, a Light Detection and Ranging, LiDAR, sensor cam be used, wherein this list must not be understood to be limiting. Furthermore, the data may also be obtained from vehicle-to-everything (V2X) communication. Which is a communication between a vehicle and any entity that may affect, or may be affected by, the vehicle. The V2X communication encompass more specific types of communication as vehicle-to-infrastructure (V2I), vehicle-to-network (V2N), vehicle-to-vehicle (V2V), vehicle-to-pedestrian (V2P), and vehicle-to-device (V2D) communications. Thereby, use of data captured by sensors of other entities can be used to obtain the first data.

Figure 3:
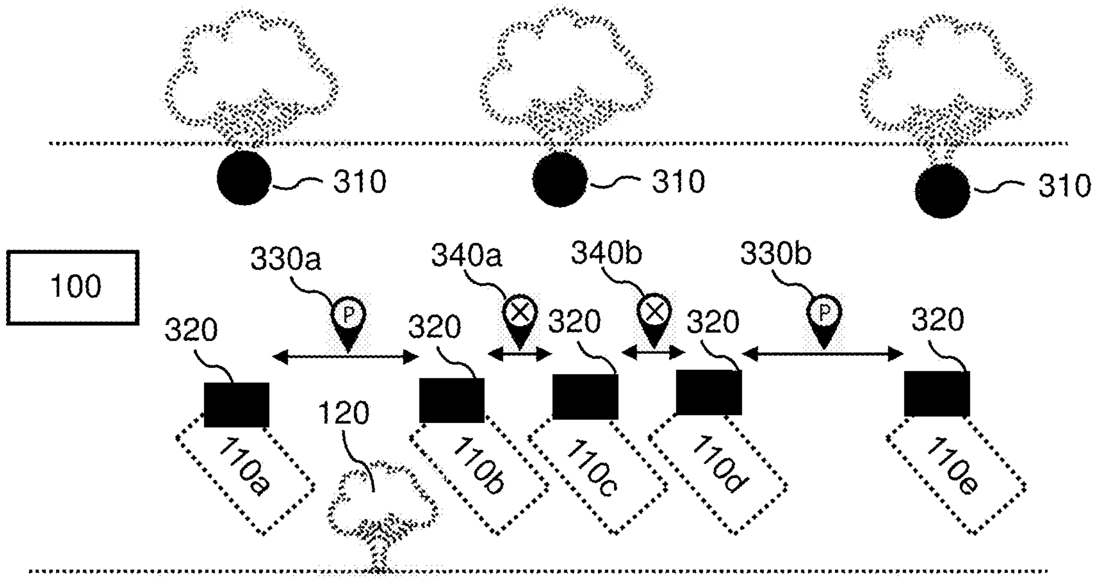
FIG. 3 shows a schematic map representation of the first data as obtained in FIG. 2.

FIG. 3 shows a schematic map representation of the first data as obtained by the radar sensor as described in context of FIG. 2. The map representation may identify different obstacle types from the first data. For example, the trees on the one side of the street are identified with dots 310 in the map. The vehicles 110*a*, 110*b*, 110*c*, 110*d*, and 110*e* are identifies as rectangulars 320. It is not necessary to obtain the concrete shape or size of the objects from the first data, it is sufficient to detect them as obstacles 310, 320 and to be able to identify between the obstacles 310, 320 at least a distance or any other characteristic, which can be compared with the at least one criterion to identify respective free parking spaces. In the here shown example, the criterion may for example be the width needed between obstacles 320 to be able to park the vehicle 100. As can be seen, the distances between vehicles 110*a* and 110*b* has been identified to match the width requirements to park the vehicle 100 and as such, it is identified as one candidate parking space 330*a*. The distances between vehicles 110*b* and 110*c* and between vehicles 110*c* and 110*d* have been identified to not match the width requirements to park the vehicle 100 and as such they are not identified as candidate parking spaces. However, the distance between the vehicles 110*d* and 110*e* then has also been identified to match the width requirements to park the vehicle 100 and as such, it is identified as one further candidate parking space 330*b*. The set of candidate parking spaces as such encompasses parking spaces 330*a* and 330*b*.

Figure 4:
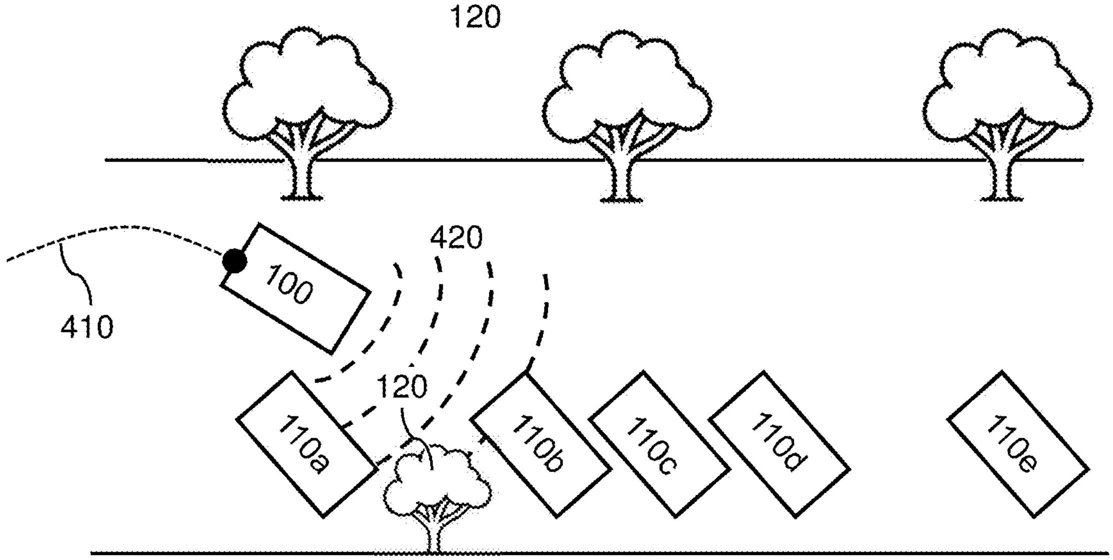
FIG. 4 shows the scenario for assisted parking of FIG. 1 with a selected first parking space.

FIG. 4 shows again the street side parking scenario of FIG. 1, but where the vehicle 100 has already started to make its way to the first identified and selected parking space 330*a*. After identifying the candidate free parking spaces from the map as shown in FIG. 3, the first free parking space 330*a* is selected. This selection can be done manually, for example by presenting the user of vehicle 100 with a selection of candidate parking spaces 330*a* and 330*b*, or the selection is done automatically, e.g. the closest one to vehicle 100 is selected. Regardless of how the parking space 330*a* is selected, the method according to the invention may guide the user to the respective parking space 330*a*, either by showing guidance information on the navigational onboard system or by guiding the vehicle in the autonomous driving mode thereto. Thereby, a path 410 may be planned, which alters the field of view of the sensors or reception capability for V2X communication in a way to better assess the first selected parking space 330*a*. This is shown in the here depicted example by the fact that the vehicle 100 has a different angle in respect to vehicles 110*a* and 110*b* as in FIG. 1. This different angle allows the vehicle 100 now to take a closer look at the selected parking space 330*a*. It is however advantageous, if the path is as such that the parking maneuver can be aborted without having to reverse the vehicle 100 and without impede the ongoing traffic.

In the here shown example, the vehicle 100 again uses a radar sensor, not shown here, and emits radio waves 420 to obtain data associated with the surrounding of the selected parking space 330*a*. It can also be said that the data represents the short-range surrounding of the vehicle 100. The second data allow the vehicle 100 to determine whether the selected parking space 330*a* really meets the at least one criterion to park the vehicle 100. In the here shown example, this is not the case, since the bush 120 obstructs the parking space 330*a*. The bush 120 was however not visible in the first data, since at the first position of vehicle 100 the field of view of the radar sensor was obstructed by the rear of vehicle 110*a*. Now in the second position of vehicle 100, the bush 120 is however in the field of view of the radar sensor and is no longer obstructed, such that it is identifiable within the second data. This allows then the determination that the selected first parking space 330*a* does not match the at least one criterion and is as such not valid, i.e. not useable for parking vehicle 100. The parking maneuver is then aborted. The set of candidate parking spaces however also encompasses still parking space 330*b*. The method according to the invention will as such select this parking space 330*b* as next parking space.

Figure 5:
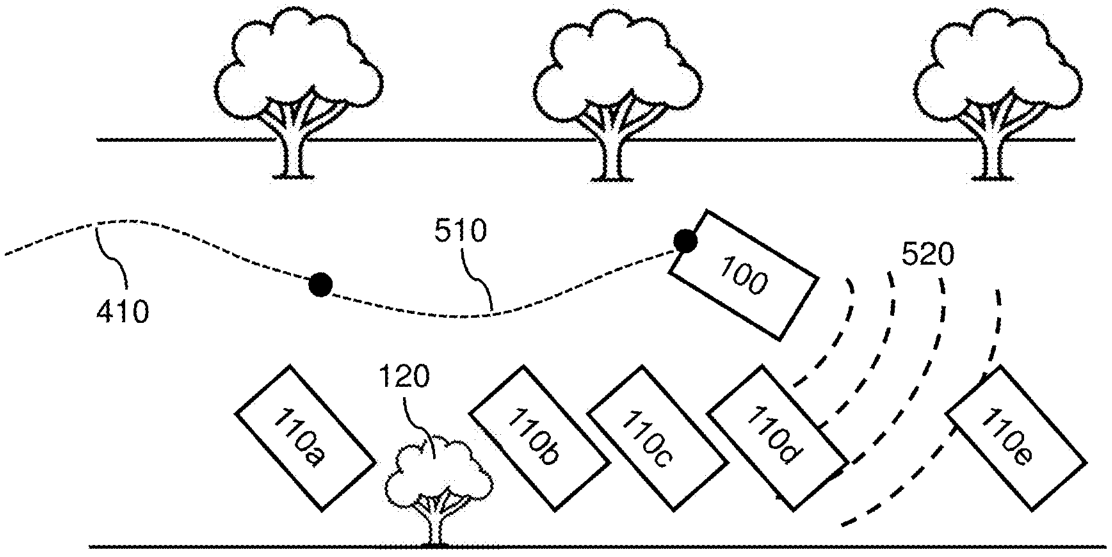
FIG. 5 shows the scenario for assisted parking of FIG. 1 with a selected second parking space.

As shown in FIG. 5, after having discarded parking space 330*a* as not being valid and having selected parking space 330*b* as next candidate parking space, another path 510 is planned and the vehicle 100 is guided to that second parking space 330*b*. Again this guidance can be done by indication on the navigational onboard system or can be done by the autonomous driving mode. Also here the vehicle 100 should be positioned in a way that it can abort the parking maneuver without having to reverse vehicle 100 and without impeding ongoing traffic. In FIG. 5 it is also shown that again the radar sensor, not shown, emits radio waves 520, in order to obtain data associated with the surrounding of parking space 330*b* to determine whether the respective parking space is valid and can be used for parking. In the here shown example, parking space 330*b* is not obstructed and can be used for parking vehicle 100.

Figure 6:
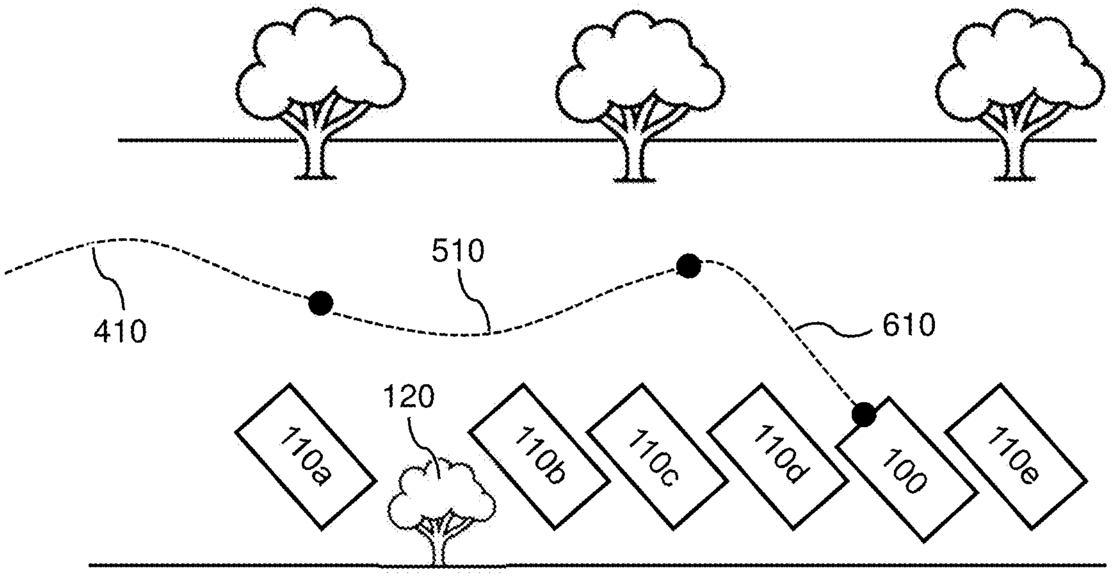
FIG. 6 shows the scenario for assisted parking of FIG. 1 with parked vehicle.

The parking of vehicle 100 is then shown in FIG. 6, where after it has been determined that the parking space 330*b* is useable in FIG. 5, a path 610 is planned which leads to parking the vehicle in the parking space 330*b*.

Figure 7:
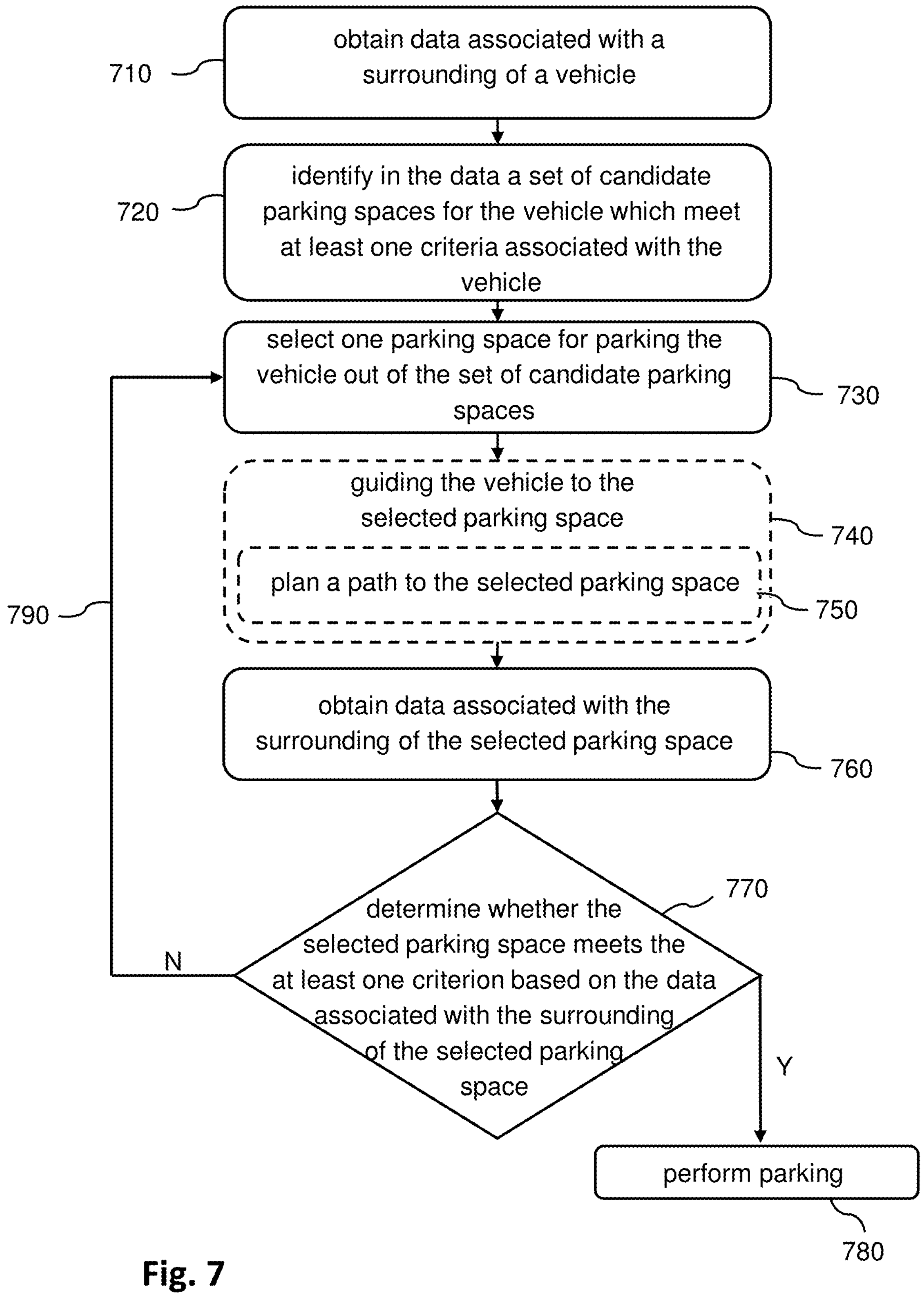
FIG. 7 shows a flow chart of the method for assisted parking according to the invention.

FIG. 7 shows a flow chart of the method for assisted parking according to the invention. The method may start once assisted parking mode is enabled. This can either be enabled by the user or automatically when for example the location of the vehicle 100 indicates that the vehicle 100 has reached the destination. It may also always automatically be enabled once a certain speed threshold is reached or a location threshold is reached around a defined location, for example home of the user, a shopping mall, workplace etc.

Once the parking mode is enabled, it starts with step 710 to obtain data associated with a surrounding of the vehicle 100. As described in context of FIG. 2, the data may originate from different onboard sensors wither alone or in combination. Furthermore, the data may originate from sources not onboard vehicle 100 but being communicated to vehicle 100. As such, obtaining data encompasses sampling data by sensors as well as receiving data from other sources.

The method then moves on to step 720 in which a set of candidate parking spaces 330*a*, 330*b* for the vehicle is identified by comparing the obtained data to at least one criterion. Thereby, the criterion may need to be matched to indicate that the parking space may be a candidate one for vehicle 100. It can also be said that the parking space is a candidate one for the vehicle 100. Candidate thereby indicates that the parking space is only a valid one with the current data at hand, i.e. it is a candidate one because it has a certain possibility to be used for the vehicle 100. It can also be said that the parking space is encompassed by the set of candidate parking spaces 330*a*, 330*b* when the possibility of it being useable to park the vehicle 100 has reached or exceeded a certain threshold probability. As such, it can also be said that a candidate parking space 330*a*, 330*b* is a possible one to park the vehicle 100.

Once the set of candidate parking spaces is identified, one parking space is selected out of the set, in step 730. This selected one may be the first of the identified parking spaces 330*a*, 330*b* or may be selected based on a different criterion.

The method of the invention optionally comprises that the vehicle 100 is then guided to the selected parking space in step 740. This step 740 of guiding the vehicle 100 may comprise that at least one path is planned in step 750 onto which the vehicle 100 is guided into the vicinity of the selected parking space. The path may include the course or trajectory the vehicle 100 has to take to move from one location to another.

Once the vehicle 100 is in the vicinity of the parking space 330*a*, 330*b* second data is obtained in step 760, wherein the data is associated with the surrounding of the selected parking space 330*a* 330*b*. This second data allows to assess whether the selected parking space 330*a*, 330*b* really meets the at least one criterion. This assessment is done in step 770 where it is determined whether the selected parking space 330*a*, 330*b* meets the at least one criterion based on the data associated with the surrounding of the selected parking space 330*a*, 330*b*. If it is determined in step 770 that the parking space 330*a*, 330*b* is valid, i.e. meets the at least one criterion, then a parking is performed in step 780. This can be an assisted or autonomous parking.

If it is determined in step 780 that the parking space 330*a*, 330*b* is not valid, i.e. does not meet the at least one criterion, then it is retuned back to step 730 and another parking space 330*a*, 330*b* is selected out of the set of candidate parking spaces 330*a*, 330*b*.

The method step 730, optionally steps 740 and 750, step 760, step 770 and step 790 are performed repeatedly until a parking space 330*a*, 330*b* is determined in step 770 to be valid and the vehicle 100 is parked in step 780.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims.

Embodiments of the present disclosure may be realized in any of various forms. Accordingly, in one or more example aspects, the functions described may be implemented in hardware, software, or any combination thereof. For example, in some embodiments, the present disclosure may be realized as a computer-implemented method, a computer-readable memory medium, or a computer system.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. In particular, with reference to the appended claims, features from dependent claims may be combined with those of the independent claims and features from respective independent claims may be combined in any appropriate manner and not merely in the specific combinations enumerated in the appended claims.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method for assisted parking of a vehicle, the method comprising:

- obtaining data associated with a long-range surrounding of the vehicle;
- identifying, in the data, a set of candidate free parking spaces for the vehicle that meet at least one size criterion associated with the vehicle needed to park the vehicle;
- selecting one parking space for parking the vehicle out of the set of candidate free parking spaces;
- obtaining data associated with a short-range surrounding of the selected parking space;
- determining whether the selected parking space meets the at least one size criterion based on the data associated with the short-range surrounding of the selected parking space;
- in response to the selected parking space being determined to meet the at least one size criterion, performing a parking maneuver; and
- in response to the selected parking space being determined to fail to meet the at least one size criterion, selecting another parking space out of the set of candidate free parking spaces.

2. The method of claim 1 further comprising guiding the vehicle to the selected parking space.

3. The method of claim 2 wherein guiding includes planning a path to the selected parking space.

4. The method of claim 3 wherein planning the path is based on machine learning.

5. The method of claim 4 wherein planning the path includes:

- transmitting information regarding at least the one selected parking space to a remote server; and
- receiving guidance information indicating a preferred path for the vehicle from the remote server.

6. The method of claim 1 wherein obtaining data associated with the long-range surrounding of the vehicle includes controlling at least one of a path or speed of the vehicle prior or during the obtaining.

7. The method of claim 1 wherein identifying the set of candidate free parking spaces includes generating a map based on the data associated with the long-range surrounding of the vehicle and using the map for identifying.

8. The method of claim 1 wherein the selecting the one parking space includes selecting a parking space lying ahead in a path of travel of the vehicle.

9. The method of claim 1 wherein selecting the another parking space includes selecting a parking space lying ahead in a path of travel of the vehicle.

10. The method of claim 1 further comprising enabling parking mode of the vehicle based on input from a user.

11. The method of claim 1 further comprising automatically enabling parking mode of the vehicle.

12. The method of claim 1 wherein the data associated with at least one of the long-range surrounding of the vehicle or the short-range surrounding of the selected parking space are obtained from at least one of:

a camera;

an ultrasonic sensor;

a radar sensor;

a Light Detection and Ranging (LiDAR) sensor; or a vehicular communication system configured for vehicle-to-everything (V2X) communications.

13. The method of claim 1 wherein at least one of identifying the set of candidate free parking spaces, selecting one parking space, or determining whether the selected parking space meets the at least one size criterion is based on a machine learning process.

14. A system comprising:

a memory storing instructions; and a set of processors configured to store the instructions, wherein the instructions include:

obtaining data associated with a long-range surrounding of a vehicle;

identifying, in the data, a set of candidate free parking spaces for the vehicle that meet at least one size criterion associated with the vehicle needed to park the vehicle;

selecting one parking space for parking the vehicle out of the set of candidate free parking spaces;

obtaining data associated with a short-range surrounding of the selected parking space;

determining whether the selected parking space meets the at least one size criterion based on the data associated with the short-range surrounding of the selected parking space;

in response to the selected parking space being determined to meet the at least one size criterion, performing a parking maneuver; and in response to the selected parking space being determined to fail to meet the at least one size criterion, selecting another parking space out of the set of candidate free parking spaces.

15. A vehicle comprising the system of claim 14.

16. A non-transitory computer-readable medium comprising instructions including:

obtaining data associated with a long-range surrounding of a vehicle;

identifying, in the data, a set of candidate free parking spaces for the vehicle that meet at least one size criterion associated with the vehicle needed to park the vehicle;

selecting one parking space for parking the vehicle out of the set of candidate free parking spaces;

obtaining data associated with a short-range surrounding of the selected parking space;

determining whether the selected parking space meets the at least one size criterion based on the data associated with the short-range surrounding of the selected parking space;

in response to the selected parking space being determined to meet the at least one size criterion, performing a parking maneuver; and in response to the selected parking space being determined to fail to meet the at least one size criterion, selecting another parking space out of the set of candidate free parking spaces.

* * * * *